US012142212B2

(12) United States Patent
Yang et al.

(10) Patent No.: US 12,142,212 B2
(45) Date of Patent: Nov. 12, 2024

(54) PIXEL CIRCUIT, DRIVE METHOD AND DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Chengchung Yang, Beijing (CN); Yucheng Chan, Beijing (CN); Yangzhong Jing, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/026,637

(22) PCT Filed: Apr. 27, 2022

(86) PCT No.: PCT/CN2022/089515

§ 371 (c)(1),
(2) Date: Mar. 16, 2023

(87) PCT Pub. No.: WO2023/206130

PCT Pub. Date: Nov. 2, 2023

(65) Prior Publication Data

US 2024/0290258 A1 Aug. 29, 2024

(51) Int. Cl.
*G09G 3/00* (2006.01)
*G09G 3/3233* (2016.01)

(52) U.S. Cl.
CPC ... *G09G 3/3233* (2013.01); *G09G 2300/0819* (2013.01); *G09G 2300/0842* (2013.01);
(Continued)

(58) Field of Classification Search
CPC ... G09G 2300/0819; G09G 2300/0861; G09G 2310/0251; G09G 2310/0262;
(Continued)

(56) References Cited

U.S. PATENT DOCUMENTS 11,170,719 B1 11/2021 Lu et al.
2015/0008400 A1* 1/2015 Kim .................... H10K 50/828 438/34

(Continued)

FOREIGN PATENT DOCUMENTS

CN 112116890 A 12/2020
CN 112216244 A 1/2021

(Continued)

*Primary Examiner* — Insa Sadio
(74) *Attorney, Agent, or Firm* — WHDA, LLP

(57) ABSTRACT

Provided are a pixel circuit, a drive method, and a display device. The pixel circuit includes a light-emitting element, a drive circuit, an energy storage circuit, a switch control circuit, a first initialization circuit, and a compensation control circuit. The switching control circuit controls a first voltage terminal to be connected to a second end of the energy storage circuit in a refresh frame and a first light-emitting phase and to control the first voltage terminal to be disconnected from the second end of the energy storage circuit in a first reset phase and a second reset phase under control of a switch control signal provided by the switch control terminal; a first initialization circuit writes a first initial voltage into the control terminal of the drive circuit under control of an initialization control signal in the first reset phase and the second reset phase.

16 Claims, 9 Drawing Sheets

(52) U.S. Cl.
CPC . *G09G 2300/0861* (2013.01); *G09G 2310/08* (2013.01); *G09G 2320/0233* (2013.01); *G09G 2340/0435* (2013.01)

(58) Field of Classification Search
CPC .......... G09G 2330/023; G09G 3/3233; G09G 3/3266; G09G 3/3291
See application file for complete search history.

(56) References Cited

U.S. PATENT DOCUMENTS

| | | | |
|---|---|---|---|
| 2021/0201782 | A1 | 7/2021 | Jang et al. |
| 2021/0407383 | A1 | 12/2021 | Lai et al. |
| 2022/0051633 | A1 | 2/2022 | Li et al. |

FOREIGN PATENT DOCUMENTS

| | | | |
|---|---|---|---|
| CN | 113066426 | A | 7/2021 |
| CN | 113539176 | A | 10/2021 |
| CN | 113851083 | A | 12/2021 |
| CN | 113870789 | A | 12/2021 |
| CN | 113971932 | A | 1/2022 |

* cited by examiner

PIXEL CIRCUIT, DRIVE METHOD AND DISPLAY DEVICE

This application is the U.S. national phase of PCT Application No. PCT/CN2022/089515 filed on Apr. 27, 2022, the entire contents of which are hereby incorporated by reference.

TECHNICAL FIELD

The present disclosure relates to the technical field of displays, and more particularly, to a pixel circuit, a drive method, and a display device.

BACKGROUND

In the related art, the brightness deficiency of the first frame and the short-term afterimage are mainly related to the hysteresis effect of the transistor, and at the low-frequency driving timing, the display cycle includes a refresh frame and a plurality of hold frames which are sequentially set. The resetting of a gate-source voltage, the writing of a data voltage and threshold voltage compensation of the drive transistor are performed only during a refresh frame, and since the number of the gate-source voltage resetting and the number of threshold voltage compensations of the drive transistor are reduced during a hold frame, charge tends to be trapped and accumulated in the drive transistor, resulting in the first frame brightness deficiency and the short-term afterimage problem during picture switching.

SUMMARY

In an aspect, an embodiment of the present disclosure provides a pixel circuit, which includes: a light-emitting element, a drive circuit, an energy storage circuit, a switch control circuit, a first initialization circuit, and a compensation control circuit. A display cycle of the pixel circuit includes a refresh frame and a hold frame, and the hold frame includes a first reset phase, a second reset phase and a first light-emitting phase that are sequentially set; a first end of the energy storage circuit is electrically connected to a control terminal of the drive circuit, and the energy storage circuit is configured to store electric energy;

the switch control circuit is electrically connected to a switch control terminal, a first voltage terminal and a second end of the energy storage circuit, and is configured to control the first voltage terminal to be connected to the second end of the energy storage circuit in the refresh frame and the first light-emitting phase, and to control the first voltage terminal to be disconnected from the second end of the energy storage circuit in the first reset phase and the second reset phase under control of a switch control signal provided by the switch control terminal;

the first initialization circuit is electrically connected to an initialization control terminal, a first initial voltage terminal and the control terminal of the drive circuit, and is configured to write a first initial voltage provided by the first initial voltage terminal into the control terminal of the drive circuit in the first reset phase and the second reset phase, under control of an initialization control signal provided by the initialization control terminal;

the compensation control circuit is electrically connected to a compensation control terminal, the control terminal of the drive circuit and a second terminal of the drive circuit, and is configured to control the control terminal of the drive circuit to be connected to the second terminal of the drive circuit under control of a compensation control signal provided by the compensation control terminal in the second reset phase; and the drive circuit is configured to generate a drive current for driving the light-emitting element under control of a potential of the control terminal of the drive circuit.

Optionally, the refresh frame includes an initialization phase and a compensation phase which are sequentially set;

the first initialization circuit is configured to write the first initial voltage into a control terminal of the drive circuit under control of the initialization control signal in the initialization phase; and the compensation control circuit is configured to control the control terminal of the drive circuit to be connected to the second terminal of the drive circuit in the compensation phase under control of the compensation control signal.

Optionally, in at least one embodiment of the present disclosure, the pixel circuit further includes a data writing circuit; the data writing circuit is electrically connected to a write control terminal, a data line and a first terminal of the drive circuit, and is configured to write a data voltage provided by the data line into the first terminal of the drive circuit under control of a write control signal provided by the write control terminal in the compensation phase.

Optionally, in at least one embodiment of the present disclosure, the pixel circuit further includes a first light-emitting control circuit and a second light-emitting control circuit; the refresh frame further includes a second light-emitting phase set after the compensation phase;

the first light-emitting control circuit is electrically connected to a light-emitting control terminal, the first voltage terminal and the first terminal of the drive circuit, and is configured to control the first voltage terminal to be connected to the first terminal of the drive circuit in the first light-emitting phase and the second light-emitting phase under control of a light-emitting control signal provided by the light-emitting control terminal;

the second light-emitting control circuit is electrically connected to the light-emitting control terminal and the second terminal of the drive circuit and a first electrode of the light-emitting element, and is configured to control the second terminal of the drive circuit to be connected to the first electrode of the light-emitting element under control of the light-emitting control signal in the first light-emitting phase and the second light-emitting phase;

a second electrode of the light-emitting element is electrically connected to a second voltage terminal.

Optionally, in at least one embodiment of the present disclosure, the pixel circuit further includes a second initialization circuit; where the second initialization circuit is electrically connected to the initialization control terminal, the second initial voltage terminal and the first electrode of the light-emitting element, and is configured to write a second initial voltage provided by the second initial voltage terminal into the first electrode of the light-emitting element under control of the initialization control signal.

Optionally, the first initialization circuit includes a first transistor, the compensation control circuit includes a second transistor, and the switch control circuit includes a third transistor;

a control electrode of the first transistor is electrically connected to the initialization control terminal, a first electrode of the first transistor is electrically connected to the first initial voltage terminal, and a second electrode of the first transistor is electrically connected to the control terminal of the drive circuit;

a control electrode of the second transistor is electrically connected to the compensation control terminal, a first electrode of the second transistor is electrically connected to the control terminal of the drive circuit, and a second electrode of the second transistor is electrically connected to the second terminal of the drive circuit;

a control electrode of the third transistor is electrically connected to the switch control terminal, a first electrode of the third transistor is electrically connected to the first voltage terminal, and a second electrode of the third transistor is electrically connected to the second end of the energy storage circuit.

Optionally, the energy storage circuit includes a storage capacitor, and the drive circuit includes a drive transistor;

a first end of the storage capacitor is the first end of the energy storage circuit, and a second end of the storage capacitor is the second end of the energy storage circuit;

a control electrode of the drive transistor is the control terminal of the drive circuit, a first electrode of the drive transistor is the first terminal of the drive circuit, and a second electrode of the drive transistor is the second terminal of the drive circuit.

Optionally, the data writing circuit includes a fourth transistor; a control electrode of the fourth transistor is electrically connected to the write control terminal, a first electrode of the fourth transistor is electrically connected to the data line, and a second electrode of the fourth transistor is electrically connected to the first terminal of the drive circuit.

Optionally, the first light-emitting control circuit includes a fifth transistor, and the second light-emitting control circuit includes a sixth transistor;

a control electrode of the fifth transistor is electrically connected to the light-emitting control terminal, a first electrode of the fifth transistor is electrically connected to the first voltage terminal, and a second electrode of the fifth transistor is electrically connected to the first terminal of the drive circuit;

a control electrode of the sixth transistor is electrically connected to the light-emitting control terminal, a first electrode of the sixth transistor is electrically connected to the second terminal of the drive circuit, and a second electrode of the sixth transistor is electrically connected to the first electrode of the light-emitting element.

Optionally, the second initialization circuit includes a seventh transistor; a control electrode of the seventh transistor is electrically connected to the initialization control terminal, a first electrode of the seventh transistor is electrically connected to the second initial voltage terminal, and a second electrode of the seventh transistor is electrically connected to the first electrode of the light-emitting element.

In a second aspect, an embodiment of the present disclosure provides a drive method applied to the pixel circuit as described above. A display cycle includes a refresh frame and a hold frame, and the hold frame includes a first reset phase, a second reset phase and a first light-emitting phase which are sequentially set; the drive method includes:

in the refresh frame and the first light-emitting phase, the switch control circuit controlling the first voltage terminal to be connected to the second end of the energy storage circuit under control of the switch control signal;

in the first reset phase and the second reset phase, the switch control circuit controlling the first voltage terminal to be disconnected from the second end of the energy storage circuit under control of the switch control signal, and the first initialization circuit writing a first initial voltage provided by the first initial voltage terminal into the control terminal of the drive circuit under control of the initialization control signal; and in the second reset phase, the compensation control circuit controlling the control terminal of the drive circuit to be connected to the second terminal of the drive circuit under control of the compensation control signal.

Optionally, the hold frame further includes a hold phase arranged between the second reset phase and the first light-emitting phase; the drive method further includes: in the hold phase, the compensation control circuit controlling the control terminal of the drive circuit to be connected to the second terminal of the drive circuit under control of the compensation control signal.

Optionally, the refresh frame includes an initialization phase and a compensation phase which are sequentially set; the drive method further includes: in the initialization phase, the first initialization circuit writing the first initial voltage into the control terminal of the drive circuit under control of the initialization control signal; and in the compensation phase, the compensation control circuit controlling the control terminal of the drive circuit to be connected to the second terminal of the drive circuit under control of the compensation control signal.

Optionally, the pixel circuit further includes a data writing circuit, a first light-emitting control circuit and a second light-emitting control circuit; the refresh frame further includes a second light-emitting phase set after the compensation phase; the drive method further includes:

in the compensation phase, the data writing circuit writing a data voltage provided by a data line into the first terminal of the drive circuit under control of a write control signal provided by a write control terminal;

in the first light-emitting phase and the second light-emitting phase, the first light-emitting control circuit controlling the first voltage terminal to be connected to the first terminal of the drive circuit under control of a light-emitting control signal provided by a light-emitting control terminal, the second light-emitting control circuit controlling the second terminal of the drive circuit to be connected to a first electrode of a light-emitting element under control of the light-emitting control signal, and the drive circuit driving the light-emitting element to emit light.

Optionally, the pixel circuit further includes a second initialization circuit; the drive method further includes: in the initialization phase, the first reset phase and the second reset phase, the second initialization circuit writing a second initial voltage provided by a second initial voltage terminal into the first electrode of the light-emitting element under control of the initialization control signal.

In a third aspect, an embodiment of the present disclosure provides a display device including the pixel circuit as described above.

DETAILED DESCRIPTION

The technical solution in embodiments of the present disclosure will be clearly and completely described below in conjunction with the drawings of the embodiments of the present disclosure. Obviously, the described embodiments are only a part of the embodiments of the present disclosure, not the whole of the embodiments. Based on the embodiments in this disclosure, all other embodiments acquired by person of ordinary skill in the art without creative effort shall fall within the protection scope of the present disclosure.

Figure 1:
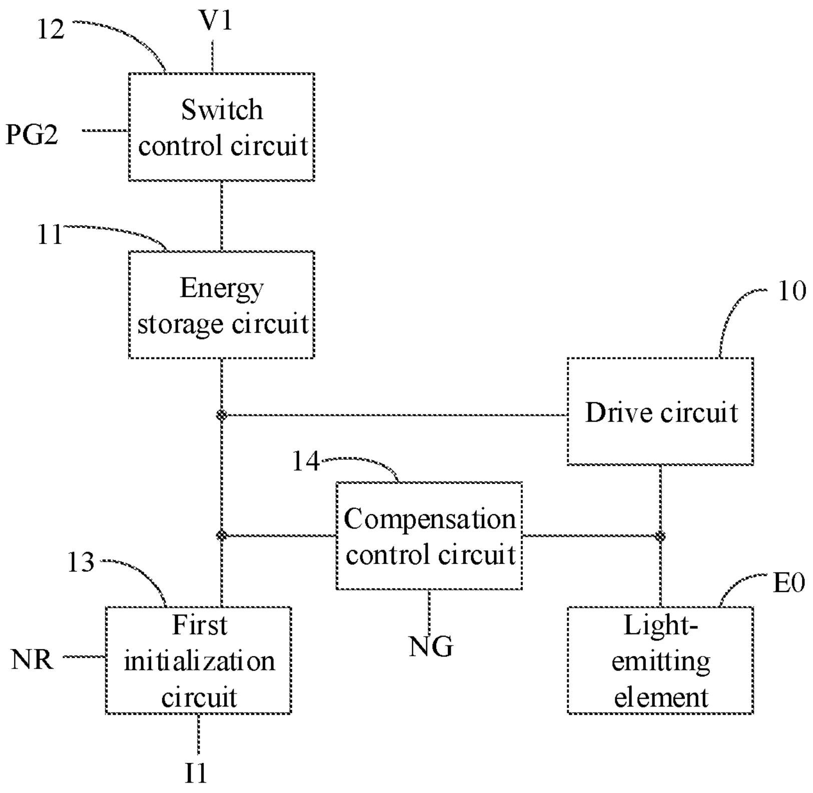
FIG. 1 is a structure diagram of a pixel circuit according to at least one embodiment of the present disclosure.

As shown in FIG. 1, a pixel circuit according to an embodiment of the present disclosure includes a light-emitting element E0, a drive circuit 10, an energy storage circuit 11, a switch control circuit 12, a first initialization circuit 13, and a compensation control circuit 14. A display cycle of the pixel circuit includes a refresh frame and a hold frame, and the hold frame includes a first reset phase, a second reset phase and a first light-emitting phase which are sequentially set;

a first end of the energy storage circuit 11 is electrically connected to the control terminal of the drive circuit 10, and the energy storage circuit 11 is configured to store electric energy;

the switch control circuit 12 is electrically connected to a switch control terminal PG2, a first voltage terminal V1 and a second end of the energy storage circuit 11, and is configured to control the first voltage terminal V1 to be connected to the second end of the energy storage circuit 11 in the refresh frame and the first light-emitting phase and to control the first voltage terminal V1 to be disconnected from the second end of the energy storage circuit 11 in the first reset phase and the second reset phase under control of a switch control signal provided by the switch control terminal PG2;

the first initialization circuit 13 is electrically connected to an initialization control terminal NR, a first initial voltage terminal I1 and the control terminal of the drive circuit 10, and is configured to write a first initial voltage Vint1 provided by the first initial voltage terminal I1 into the control terminal of the drive circuit 10 in the first reset phase and the second reset phase under control of an initialization control signal provided by the initialization control terminal NR;

the compensation control circuit 14 is electrically connected to a compensation control terminal NG, the control terminal of the drive circuit 10 and the second terminal of the drive circuit 10, and is configured to control the control terminal of the drive circuit 10 to be connected to the second terminal of the drive circuit 10 under control of the compensation control signal provided by the compensation control terminal NG in the second reset phase;

the drive circuit 10 is electrically connected to the light-emitting element E0, and is configured to generate a drive current for driving the light-emitting element E0 under control of a potential of the control terminal of the drive circuit.

When the pixel circuit of at least one embodiment of the present disclosure as shown in FIG. 1 is in operation, in low frequency display, the display cycle includes a refresh frame and a hold frame; the hold frame includes a first reset phase, a second reset phase and a first light-emitting phase which are sequentially set;

in the refresh frame and the first light-emitting phase, the switch control circuit 12 controls the first voltage terminal V1 to be connected to the second end of an energy storage circuit 11 under control of the switch control signal;

in the first reset phase and the second reset phase, the switch control circuit 12 controls the first voltage terminal V1 to be disconnected from the second end of the energy storage circuit 11 under control of the switch control signal, and the first initialization circuit 13 writes the first initial voltage Vint1 provided by the first initial voltage terminal I1 into the control terminal of the drive circuit 10 under control of an initialization control signal;

in the second reset phase, the compensation control circuit 14 controls the control terminal of the drive circuit 10 to be connected to the second terminal of the drive circuit 10 under control of the compensation control signal.

When the pixel circuit of the at least one embodiment of the present disclosure is in operation, in low frequency display, in the first reset phase and the second reset phase in each hold frame, a first initial voltage Vint1 is written into the control terminal of the drive circuit 10 by the first initialization circuit 13 under the control of the initialization control signal, so as to reset the gate-source voltage of the drive transistor in the drive circuit 10 during a partial period of each hold frame, so that the drive transistor is in an OFF-Bias state, and charge accumulated and trapped in the drive transistor is reduced by resetting the drive transistor in each frame, which improves first frame brightness deficiency and short-term afterimage when a picture is switched during low-frequency driving. When the pixel circuit of the at least one embodiment of the present disclosure is in operation, in low-frequency display, in each hold frame, the threshold voltage of the drive transistor can also be compensated, and the problem of picture quality/Mura (uneven brightness) caused by the non-uniformity of the threshold voltages of the drive transistors can also be compensated.

In at least one embodiment of the present disclosure, the refresh frame includes an initialization phase and a compensation phase which are sequentially set;

the first initialization circuit is configured to write the first initial voltage into a control terminal of the drive circuit under the control of the initialization control signal in the initialization phase, so that the drive circuit can be turned on at the start of the compensation phase so as to perform threshold voltage compensation;

the compensation control circuit is configured to control the control terminal of the drive circuit to be connected to the second terminal of the drive circuit in the compensation phase under control of the compensation control signal.

In at least one embodiment of the present disclosure, the pixel circuit may further include a data writing circuit; the data writing circuit is electrically connected to a write control terminal, a data line and the first terminal of the drive circuit, and is configured to write a data voltage provided by the data line into the first terminal of the drive circuit under control of a write control signal provided by the write control terminal in the compensation phase, so as to perform data voltage writing.

In at least one embodiment of the present disclosure, the pixel circuit further includes a first light-emitting control circuit and a second light-emitting control circuit; the refresh frame further includes a second light-emitting phase that is set after the compensation phase;

the first light-emitting control circuit is electrically connected to a light-emitting control terminal, the first voltage terminal and the first terminal of the drive circuit, and is configured to control the first voltage terminal to be connected to the first terminal of the drive circuit in the first light-emitting phase and the second light-emitting phase under control of a light-emitting control signal provided by the light-emitting control terminal;

the second light-emitting control circuit is electrically connected to the light-emitting control terminal and the second terminal of the drive circuit and a first electrode of the light-emitting element, and is configured to control the second terminal of the drive circuit to be connected to the first electrode of the light-emitting element under control of the light-emitting control signal in the first light-emitting phase and the second light-emitting phase;

a second electrode of the light-emitting element is electrically connected to a second voltage terminal.

In a particular implementation, in at least one embodiment of the present disclosure, the pixel circuit may further include a first light-emitting control circuit and a second light-emitting control circuit. In the first light-emitting phase and the second light-emitting phase, the first light-emitting control circuit controls a first voltage terminal to be connected to the first terminal of the drive circuit under control of a light-emitting control signal, and the second light-emitting control circuit controls the second terminal of the drive circuit to be connected to a first electrode of a light-emitting element under control of the light-emitting control signal, and the drive circuit controls the light-emitting element to emit light.

Figure 2:
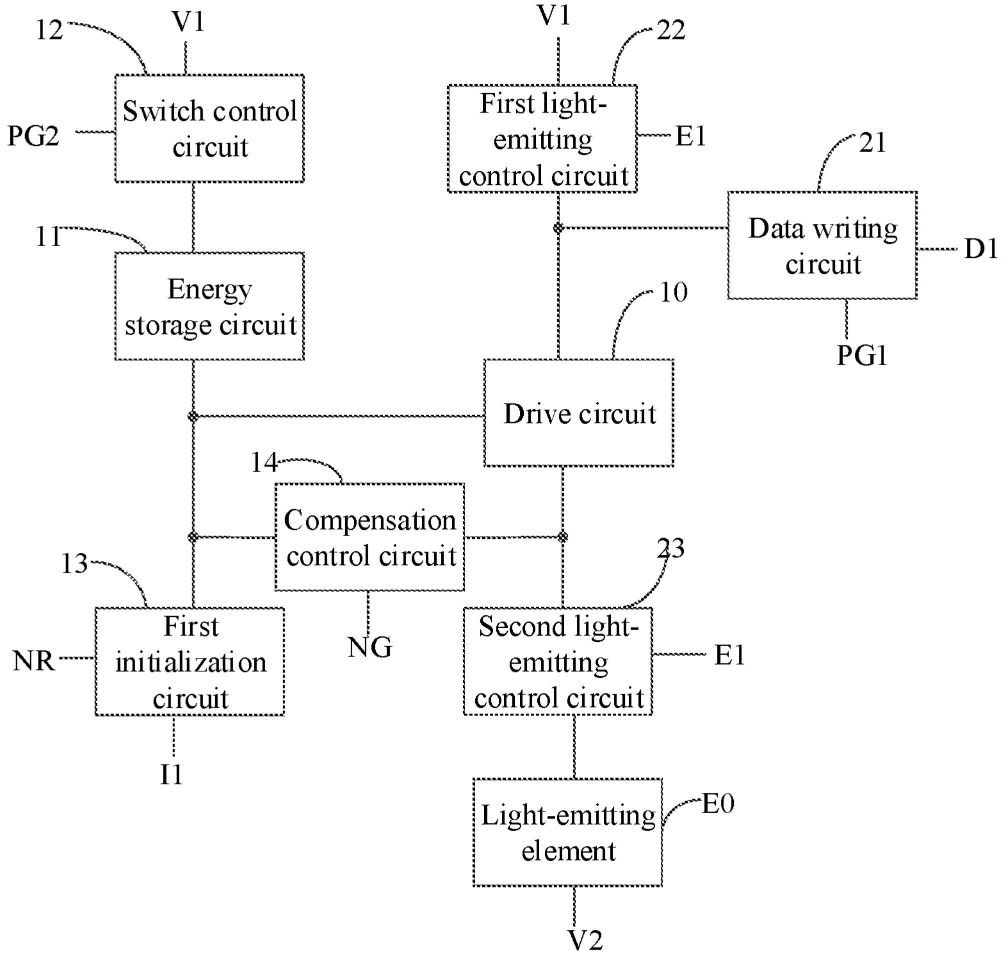
FIG. 2 is a structure diagram of a pixel circuit according to at least one embodiment of the present disclosure.

As shown in FIG. 2, on the basis of at least one embodiment of the pixel circuit shown in FIG. 1, in at least one embodiment of the present disclosure, the pixel circuit further includes a data writing circuit 21, a first light-emitting control circuit 22 and a second light-emitting control circuit 23.

The data writing circuit 21 is electrically connected to a write control terminal PG1, a data line DI and the first terminal of the drive circuit 10, and is configured to write a data voltage provided by the data line DI into the first terminal of the drive circuit 10 under control of the write control signal provided by the write control terminal PG1 in the compensation phase;

the first light-emitting control circuit 22 is electrically connected to a light-emitting control terminal E1, the first voltage terminal V1 and the first terminal of the drive circuit 10, and is configured to control the first voltage terminal V1 to be connected to the first terminal of the drive circuit 10 under control of the light-emitting control signal provided by the light-emitting control terminal E1;

the second light-emitting control circuit 23 is electrically connected to the light-emitting control terminal E1, the second terminal of the drive circuit 10 and a first electrode of the light-emitting element E0, and is configured to control the second terminal of the drive circuit 10 to be connected to the first electrode of the light-emitting element E0 under control of the light-emitting control signal;

a second electrode of the light-emitting element E0 is electrically connected to a second voltage terminal V2.

In at least one embodiment of the pixel circuit shown in FIG. 2, a first node A is electrically connected to the control terminal of the drive circuit 10, a second node B is electrically connected to the second end of the energy storage circuit 11, and a third node C is electrically connected to the first terminal of the drive circuit 10.

In at least one embodiment of the present disclosure, the first voltage terminal V1 may be a high voltage terminal, and the second voltage terminal V2 may be a low voltage terminal, but this is not limiting.

When the pixel circuit of at least one embodiment of the present disclosure as shown in FIG. 2 is in operation in low frequency display, the display cycle of the pixel circuit includes a refresh frame and a hold frame which are sequentially set, and the refresh frame includes an initialization phase, a compensation phase and a second light-emitting phase which are sequentially set; the hold frame includes a first reset phase, a second reset phase, a hold phase and a first light-emitting phase which are sequentially set;

in the refresh frame, the switch control circuit 12 controls the first voltage terminal V1 to be connected to the second end of the energy storage circuit 11 under control of the switch control signal provided by the switch control terminal PG2;

in the initialization phase, the first initialization circuit 13 writes the first initial voltage Vint1 provided by the first initial voltage terminal I1 into the control terminal of the drive circuit 10 under the control of the initialization control signal provided by the initialization control terminal NR, so that at the start of the compensation phase, the drive circuit 10 can control the first terminal of the drive circuit 10 to be connected to the second terminal of the drive circuit 10 under the control of the potential of the control terminal of the drive circuit;

in the compensation phase, the data writing circuit writes a data voltage Vdata provided by the data line DI into the first terminal of the drive circuit 10 under the control of the write control signal provided by the write control terminal PG1; the compensation control circuit 14 controls the control terminal of the drive circuit 10 to be connected to the second terminal of the drive circuit 10 under control of the compensation control signal provided by the compensation control terminal NG;

at the start of the compensation phase, the drive circuit 10 controls the first terminal of the drive circuit 10 to be connected to the second terminal of the drive circuit 10 under control of the potential of the control terminal of the drive circuit, and charges the energy storage circuit 11 via the data voltage Vdata so as to change the potential of the control terminal of the drive circuit 10 until the drive circuit 10 controls the first terminal of the drive circuit 10 to be disconnected from the second terminal of the drive circuit 10 under control of the potential of the control terminal of the drive circuit, at this moment, the potential of the control terminal of the drive circuit 10 is Vdata+Vth, where Vth is a threshold voltage of the drive transistor in the drive circuit 10;

in the second light-emitting phase, the first light-emitting control circuit 22 controls the first voltage terminal V1 to be connected to the first terminal of the drive circuit 10 under the control of the light-emitting control signal provided by the light-emitting control terminal E1, and the second light-emitting control circuit 23 controls the second terminal of the drive circuit 10 to be connected to the first electrode of the light-emitting element E0 under the control of the light-emitting control signal; a drive circuit 10 drives the light-emitting element E0 to emit light; in the light-emitting phase, the current for driving the light-emitting element E0 driven by the drive circuit 10 is independent of Vth, and a threshold voltage shift can be compensated;

in the first reset phase in the hold frame, the switch control circuit 12 controls the first voltage terminal V1 to be disconnected from the second end of the energy storage circuit 11 under the control of a switch control signal provided by the switch control terminal PG2; the first initialization circuit 13 writes the first initial voltage Vint1 provided by the first initial voltage terminal I1 into the control terminal of the drive circuit 10 under the control of the initialization control signal provided by the initialization control terminal NR; since the second node B is in a floating state, the first node A provides the first initial voltage Vint1; through the coupling effect of the storage capacitor in the energy storage circuit 11, the potential of the second node B also changes with the change of the potential of the first node A, and Vdata+Vth is still stored in the storage capacitor;

in the second reset phase of the hold frame, the switch control circuit 12 controls the first voltage terminal V1 to be disconnected from the second end of the energy storage circuit 11 under the control of the switch control signal provided by the switch control terminal PG2; under the control of the write control signal provided by the write control terminal PG1, the data write circuit 21 controls the data line DI to be disconnected from the first terminal of the drive circuit 10, and does not perform data voltage writing; the first initialization circuit 13 writes the first initial voltage Vint1 provided by the first initial voltage terminal I1 into the control terminal of the drive circuit 10 under the control of the initialization control signal provided by the initialization control terminal NR, and the compensation control circuit 14 controls the control terminal of the drive circuit 10 to be connected to the second terminal of the drive circuit 10 under the control of the compensation control signal provided by the compensation control terminal NG; the third node C is in a floating state;

at the start of the second reset phase, the drive circuit 10 controls the first terminal of the drive circuit 10 to be connected to the second terminal of the drive circuit 10 under control of the potential of the control terminal of the drive circuit; the drive circuit 10, the compensation control circuit 14 and the first initialization circuit 13 discharge to the first initial voltage terminal I1, and the potential of the third node C gradually decreases until the drive circuit 10, under the control of the potential of the control terminal of the drive circuit, controls the first terminal of the drive circuit 10 to be disconnected from the second terminal of the drive circuit 10, and enables the drive transistor in an OFF-Bias state, at this moment, the potential of the first node A is Vint1, the potential of the third node C is Vint1−Vth, and the energy storage circuit 11 still keeps Vdata+Vth;

in the hold phase of the hold frame, the compensation control circuit 14 controls the control terminal of the drive circuit 10 to be connected to the second terminal of the drive circuit 10 under the control of the compensation control signal provided by the compensation control terminal NG, and at this moment, the drive transistor is still in an OFF-Bias state, and the potential of each node is consistent with that in the second reset phase;

in the first light-emitting phase of the hold frame, the switch control circuit 12 controls the first voltage terminal V1 to be connected to the second end of the energy storage circuit 11 under control of the switch control signal provided by the switch control terminal PG2; the compensation control circuit 14 controls the control terminal of the drive circuit 10 to be disconnected from the second terminal of the drive circuit 10 under the control of the compensation control signal provided by the compensation control terminal NG, the first light-emitting control circuit 22 controls the first voltage terminal V1 to be connected to the first terminal of the drive circuit 10 under the control of the light-emitting control signal provided by the light-emitting control terminal E1, and the second light-emitting control circuit 23 controls the second terminal of the drive circuit 10 to be connected to the first electrode of the light-emitting element E0 under the control of the light-emitting control signal; a drive circuit 10 drives the light-emitting element E0 to emit light; in the light-emitting phase, the drive circuit 10 drives the light-emitting element E0 with a current that is independent of Vth, so that the threshold voltage shift can be compensated.

When the pixel circuit according to at least one embodiment of the present disclosure is driven at a low frequency, a reset timing is added in a hold frame, and at this time, the data voltage is not refreshed and written; the gate-source voltage of the drive transistor is reset in each hold frame, so that the drive transistor is in an OFF-Bias state; and the amount of the charge accumulated and trapped in the drive transistor is reduced by resetting the drive transistor in each frame, ameliorating the first frame brightness deficiency and short-term afterimage when a picture is switched during low-frequency driving.

In at least one embodiment of the present disclosure, the pixel circuit further includes a second initialization circuit; the second initialization circuit is electrically connected to the initialization control terminal, the second initial voltage terminal and the first electrode of the light-emitting element, and is configured to write the second initial voltage provided by the second initial voltage terminal into the first electrode of the light-emitting element under the control of the initialization control signal, so as to control the light-emitting element not to emit light, ensure that the dark state brightness of the light-emitting element is sufficiently dark, and clear the charge remaining in the first electrode of the light-emitting element.

Figure 3:
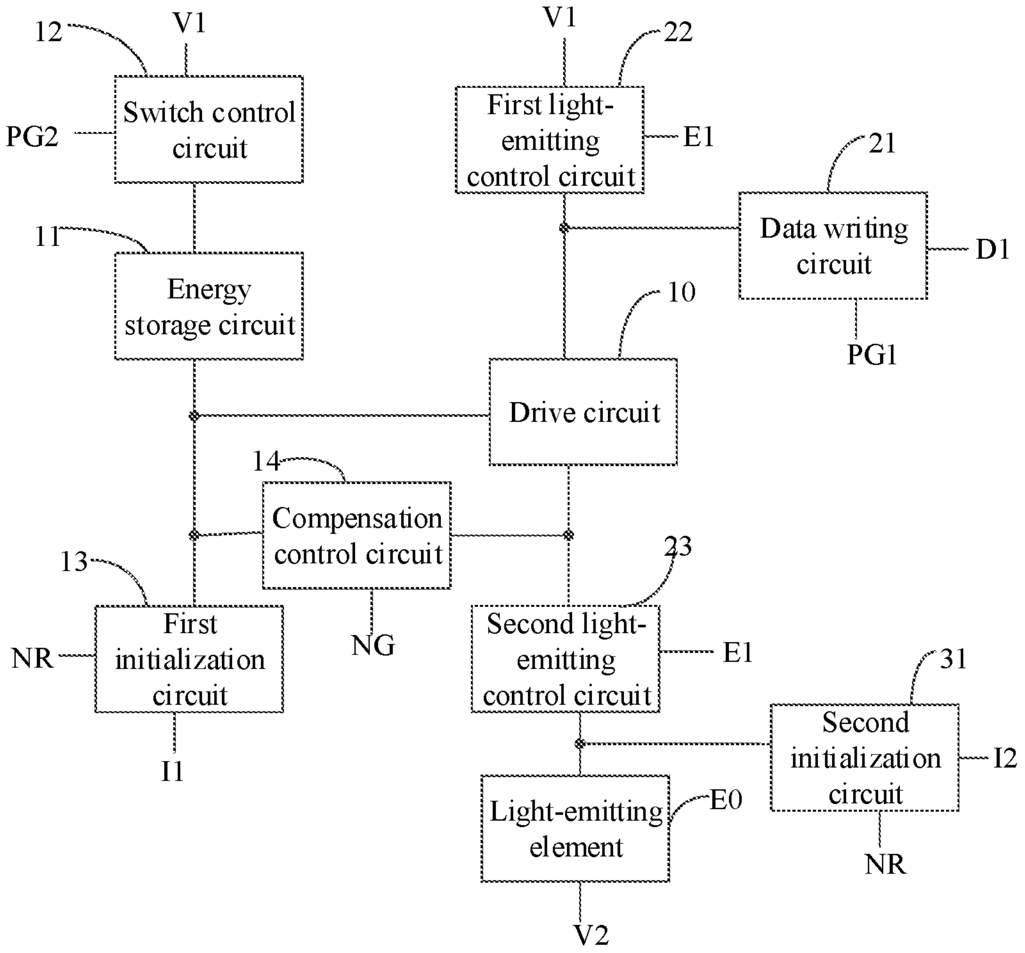
FIG. 3 is a structure diagram of a pixel circuit according to at least one embodiment of the present disclosure.

As shown in FIG. 3, on the basis of at least one embodiment of the pixel circuit shown in FIG. 2, in at least one embodiment of the present disclosure, the pixel circuit further includes a second initialization circuit 31; the second initialization circuit 31 is electrically connected to the initialization control terminal NR, the second initial voltage terminal 12 and the first electrode of the light-emitting element E0, and is configured to write a second initial voltage Vint2 provided by the second initial voltage terminal 12 into the first electrode of the light-emitting element E0 under the control of the initialization control signal, so as to control the light-emitting element E0 not to emit light, ensure that the dark state brightness of the light-emitting element is sufficiently dark, and clear the charge residing in the first electrode of the light-emitting element E0.

In at least one embodiment of the present disclosure, the first initial voltage terminal I1 and the second initial voltage terminal 12 may be the same initial voltage terminal for providing an initial voltage Vint, but this is not limiting.

When the pixel circuit of at least one embodiment of the present disclosure as shown in FIG. 3 is in operation, in the initialization phase, the first reset phase and the second reset phase, the second initialization circuit 31 writes the second initial voltage Vint2 provided by the second initial voltage terminal 12 into the first electrode of the light-emitting element E0 under control of the initialization control signal.

Optionally, the first initialization circuit includes a first transistor, the compensation control circuit includes a second transistor, and the switch control circuit includes a third transistor;

- a control electrode of the first transistor is electrically connected to the initialization control terminal, a first electrode of the first transistor is electrically connected to the first initial voltage terminal, and a second electrode of the first transistor is electrically connected to the control terminal of the drive circuit;
- a control electrode of the second transistor is electrically connected to the compensation control terminal, a first electrode of the second transistor is electrically connected to the control terminal of the drive circuit, and a second electrode of the second transistor is electrically connected to the second terminal of the drive circuit;
- a control electrode of the third transistor is electrically connected to the switch control terminal, a first electrode of the third transistor is electrically connected to the first voltage terminal, and a second electrode of the third transistor is electrically connected to the second end of the energy storage circuit.

Optionally, the energy storage circuit includes a storage capacitor, and the drive circuit includes a drive transistor; a first end of the storage capacitor is the first end of the energy storage circuit, and a second end of the storage capacitor is the second end of the energy storage circuit. A control electrode of the drive transistor is the control terminal of the drive circuit, a first electrode of the drive transistor is the first terminal of the drive circuit, and a second electrode of the drive transistor is the second terminal of the drive circuit.

Optionally, the data writing circuit includes a fourth transistor; a control electrode of the fourth transistor is electrically connected to the write control terminal, a first electrode of the fourth transistor is electrically connected to the data line, and a second electrode of the fourth transistor is electrically connected to the first terminal of the drive circuit.

Optionally, the first light-emitting control circuit includes a fifth transistor, and the second light-emitting control circuit includes a sixth transistor. A control electrode of the fifth transistor is electrically connected to the light-emitting control terminal, a first electrode of the fifth transistor is electrically connected to the first voltage terminal, and a second electrode of the fifth transistor is electrically connected to the first terminal of the drive circuit. A control electrode of the sixth transistor is electrically connected to the light-emitting control terminal, a first electrode of the sixth transistor is electrically connected to the second terminal of the drive circuit, and a second electrode of the sixth transistor is electrically connected to the first electrode of the light-emitting element.

Optionally, the second initialization circuit includes a seventh transistor; a control electrode of the seventh transistor is electrically connected to the initialization control terminal, a first electrode of the seventh transistor is electrically connected to the second initial voltage terminal, and a second electrode of the seventh transistor is electrically connected to the first electrode of the light-emitting element.

In at least one embodiment of the present disclosure, the light-emitting element is an organic light-emitting diode, and the first electrode of the light-emitting element is an anode and the second electrode of the light-emitting element is a cathode, but this is not limiting.

Figure 4:
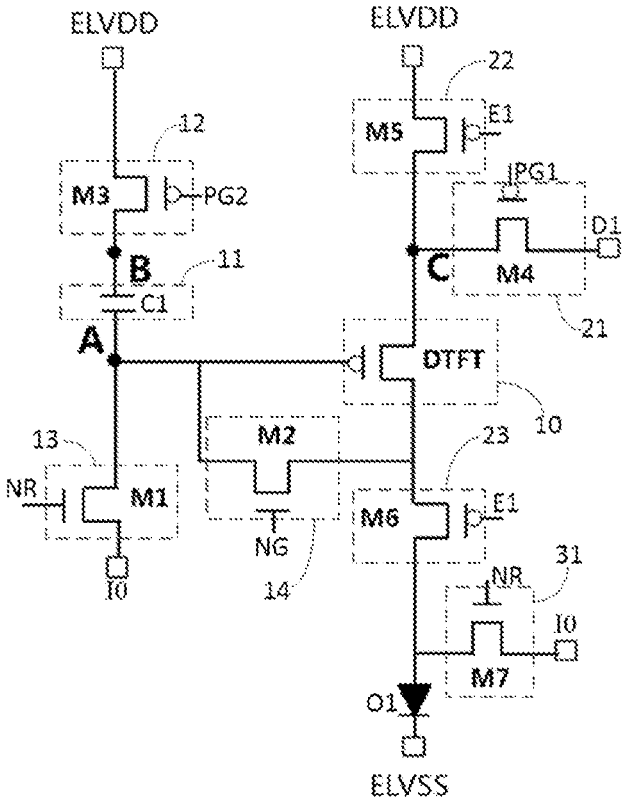
FIG. 4 is a circuit diagram of a pixel circuit according to at least one embodiment of the present disclosure.

As shown in FIG. 4, on the basis of at least one embodiment of the pixel circuit shown in FIG. 3, the first initialization circuit 13 includes a first transistor M1, the compensation control circuit 14 includes a second transistor M2, and the switch control circuit 12 includes a third transistor M3; the drive circuit 10 includes a drive transistor DTFT; the energy storage circuit 11 includes a storage capacitor C1; the light-emitting element is an organic light-emitting diode O1;

- a gate electrode of the first transistor M1 is electrically connected to the initialization control terminal NR, a source electrode of the first transistor M1 is electrically connected to an initial voltage terminal 10, and a drain electrode of the first transistor M1 is electrically connected to a gate electrode of the drive transistor DTFT; the initial voltage terminal 10 is used for providing an initial voltage Vint;
- a gate electrode of the second transistor M2 is electrically connected to the compensation control terminal NG, a source electrode of the second transistor M2 is electrically connected to the gate electrode of the drive transistor DTFT, and a drain electrode of the second transistor M2 is electrically connected to a drain electrode of the drive transistor M0;

a gate electrode of the third transistor M3 is electrically connected to the switch control terminal PG2, a source electrode of the third transistor M3 is electrically connected to the high voltage terminal, and a drain electrode of the third transistor M3 is electrically connected to the second end of the storage capacitor C1; the high voltage terminal is used for providing a high voltage ELVDD;

a first end of the storage capacitor C1 is electrically connected to the gate electrode of the drive transistor DTFT;

the data writing circuit 21 includes a fourth transistor M4;

a gate electrode of the fourth transistor M4 is electrically connected to the write control terminal PG1, a source electrode of the fourth transistor M4 is electrically connected to the data line DI, and a drain electrode of the fourth transistor M4 is electrically connected to a source electrode of the drive transistor DTFT;

the first light-emitting control circuit 22 includes a fifth transistor M5, and the second light-emitting control circuit 23 includes a sixth transistor M6;

a gate electrode of the fifth transistor M5 is electrically connected to the light-emitting control terminal E1, a source electrode of the fifth transistor M5 is electrically connected to the high voltage terminal, and a drain electrode of the fifth transistor M5 is electrically connected to the source electrode of the drive transistor DTFT;

a gate electrode of the sixth transistor M6 is electrically connected to the light-emitting control terminal E1, a source electrode of the sixth transistor M6 is electrically connected to the drain electrode of the drive transistor DTFT, and a drain electrode of the sixth transistor M6 is electrically connected to the anode of the organic light-emitting diode O1;

the second initialization circuit 31 includes a seventh transistor M7;

a gate electrode of the seventh transistor M7 is electrically connected to the initialization control terminal NR, a source electrode of the seventh transistor M7 is electrically connected to the initial voltage terminal 10, and a drain electrode of the seventh transistor M7 is electrically connected to the anode of the organic light-emitting diode O1;

a cathode of the organic light-emitting diode O1 is electrically connected to a low voltage terminal; the low voltage terminal is for providing a low voltage ELVSS.

In at least one embodiment of the pixel circuit shown in FIG. 4, the first initial voltage terminal and the second initial voltage terminal are both the initial voltage terminal I0 for providing an initial voltage Vint.

In at least one embodiment of the pixel circuit shown in FIG. 4, which is an 8TIC LTPO pixel circuit, each of the first transistor M1, the second transistor M2 and the seventh transistor M7 are all NMOS transistors, and the third transistor M3, the fourth transistor M4, the fifth transistor M5 and the sixth transistor M6 is PMOS (P-type metal-oxide-semiconductor) transistor.

In at least one embodiment as shown in FIG. 4, the first transistor M1 and the second transistor M2 are NMOS transistors to reduce the leakage current in favor of maintaining the potential of the gate electrode of the drive transistor DTFT.

In FIG. 4, the first node A is electrically connected to the gate electrode of the drive transistor DTFT, the second node B is electrically connected to the second terminal of C1, and the third node C is electrically connected to the source electrode of the drive transistor DTFT.

Figure 5:
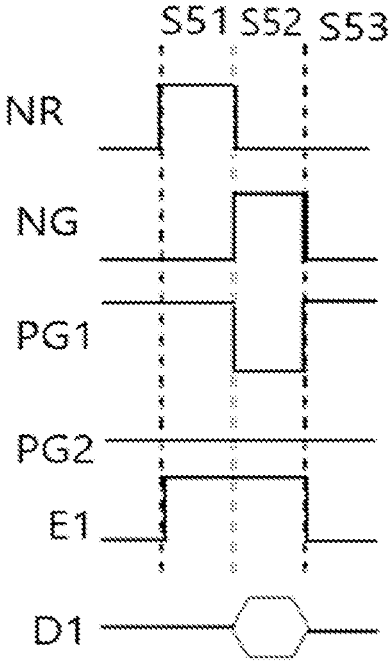
FIG. 5 is an operational timing diagram of at least one embodiment of the pixel circuit of the present disclosure as shown in FIG. 4.
Figure 6A:
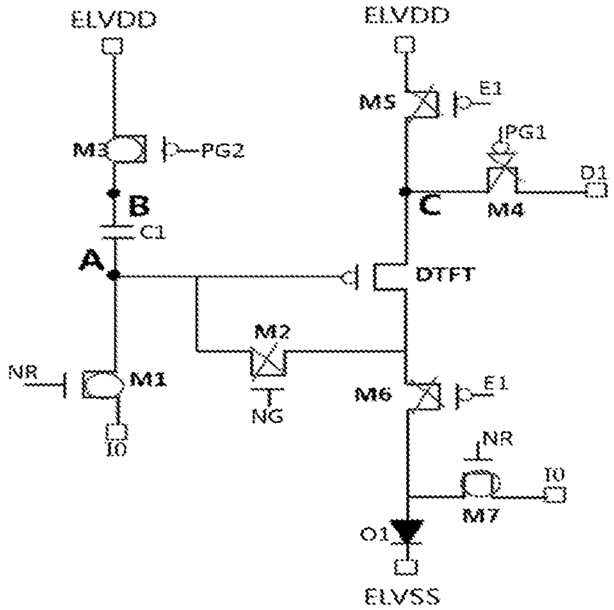
FIG. 6A is a schematic diagram illustrating an operation state of the pixel circuit shown in FIG. 4 in an initialization phase according to at least one embodiment of the present disclosure.
Figure 6B:
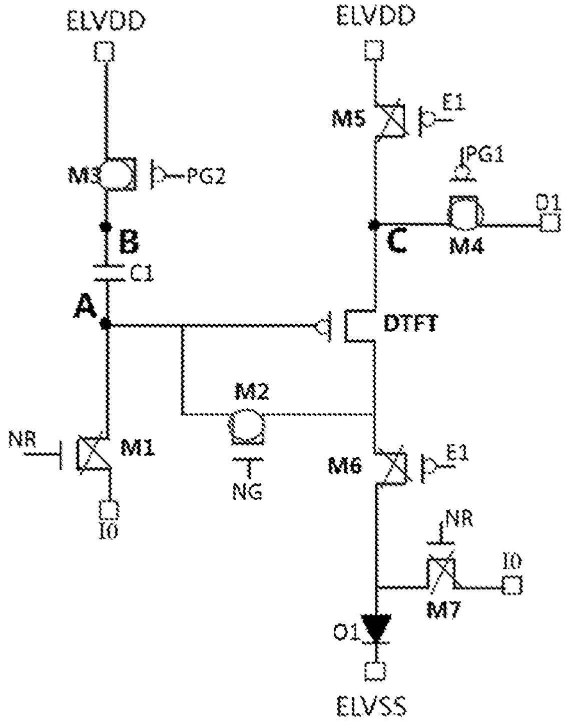
FIG. 6B is a schematic diagram illustrating an operation state of the pixel circuit shown in FIG. 4 in a compensation phase according to at least one embodiment of the present disclosure.
Figure 6C:
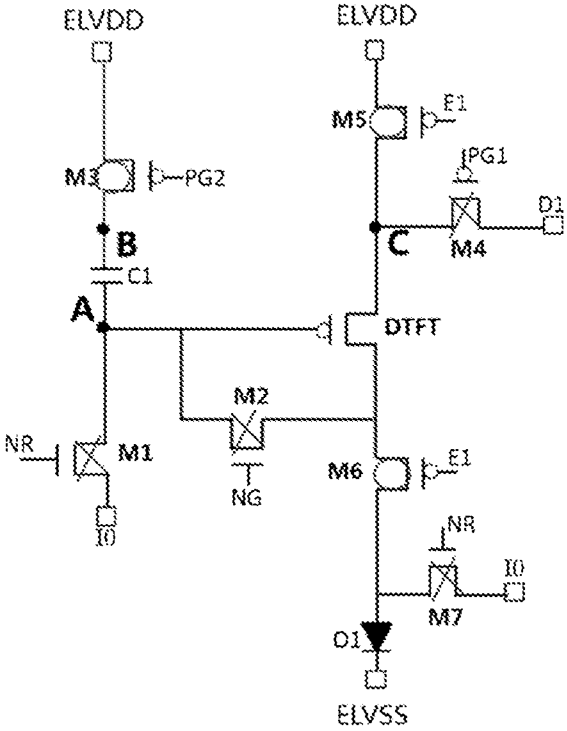
FIG. 6C is a schematic diagram illustrating an operation state of the pixel circuit shown in FIG. 4 in a compensation phase according to at least one embodiment of the present disclosure.

As shown in FIG. 5, when the pixel circuit of at least one embodiment of the present disclosure as shown in FIG. 4 is in operation, the refresh frame includes an initialization phase S51, a compensation phase S52 and a second light-emitting phase S53 which are sequentially set;

in the initialization phase S51, the initialization control terminal NR provides a high voltage signal, the compensation control terminal NG provides a low voltage signal, the write control terminal PG1 provides a high voltage signal, the switch control terminal PG2 provides a low voltage signal, and E1 provides a high voltage signal, as shown in FIG. 6A, the third transistor M3 is turned on, the first transistor M1 and the seventh transistor M7 are turned on, the second transistor M2, the fourth transistor M4, the fifth transistor M5, the sixth transistor M6 and the drive transistor DTFT are turned off, and the initial voltage terminal I0 provides the initial voltage Vint, the second node B is connected to the high voltage terminal, and the initial voltage Vint is written into the first node A and the anode of the organic light-emitting diode O1 to initialize the potential of the gate electrode of the drive transistor DTFT, so that at the start of the compensation phase S52, the drive transistor DTFT can be turned on, and the dark state brightness of the organic light-emitting diode O1 is ensured to be sufficiently dark;

in the compensation phase S52, the initialization control terminal NR provides a low voltage signal, the compensation control terminal NG provides a high voltage signal, the write control terminal PG1 provides an excessively low voltage signal, the switch control terminal PG2 provides a low voltage signal, and E1 provides a high voltage signal, as shown in FIG. 6B, the second transistor M2 and the third transistor M3 are turned on, the first transistor M1, the fourth transistor M4, the fifth transistor M5, the sixth transistor M6 and the seventh transistor M7 are all turned off, and the data line DI provides the data voltage Vdata;

at the start of the compensation phase S52, the drive transistor DTFT is turned on, the data voltage Vdata charges for C1 via the fourth transistor M4, the drive transistor DTFT and the second transistor M2, so as to raise the potential of the first node A until the drive transistor DTFT is turned off, at this moment, the potential of the first node A is Vdata+Vth, and the voltage is stored in C1, where Vth is the threshold voltage of the drive transistor DTFT;

in the second light-emitting phase S53, the initialization control terminal NR provides a low voltage signal, the compensation control terminal NG provides a low voltage signal, the write control terminal PG1 provides a high voltage signal, the switch control terminal PG2 provides a low voltage signal, E1 provides a low voltage signal, as shown in FIG. 6C, the third transistor M3 is turned on, the fifth transistor M5, the drive transistor DTFT and the sixth transistor M6 are all turned on, the potential of the third node C is ELVDD, and the drive transistor DTFT drives the organic light-emitting diode O1 to emit light; the drive current of the drive transistor DTFT for driving the organic light-emitting diode O1 to emit light is proportional to $(Vdata-ELVDD)^2$, and the drive current is independent of Vth, compensating the problem of a threshold voltage shift of the drive transistor;

in the second light-emitting phase S53, the potential of the first node A is Vdata+Vth, and the potential of the second node B and the potential of the third node C are ELVDD.

In FIG. 6A, FIG. 6B, and FIG. 6C, a circle represents that the corresponding transistor is turned on, and a cross represents that the corresponding transistor is turned off.

Figure 7:
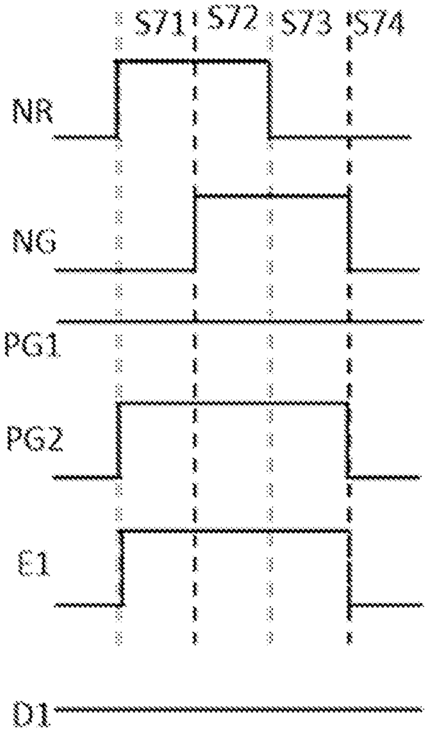
FIG. 7 is an operational timing diagram of the pixel circuit shown in FIG. 4 according to at least one embodiment of the present disclosure.
Figure 8A:
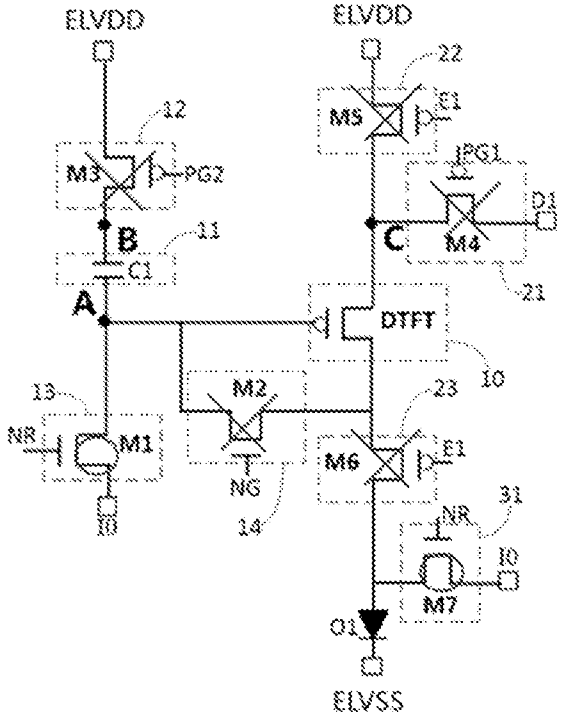
FIG. 8A is a schematic diagram illustrating an operation state of the pixel circuit shown in FIG. 4 in a first reset phase according to at least one embodiment of the present disclosure.

As shown in FIG. 7, when the pixel circuit of at least one embodiment of the present disclosure as shown in FIG. 4 is in operation, the refresh frame includes a first reset phase S71, a second reset phase S72, a hold phase S73 and a first light-emitting phase S74, which are sequentially set;

In the first reset phase S71, the initialization control terminal NR provides a high voltage signal, the compensation control terminal NG provides a low voltage signal, the write control terminal PG1 provides a high voltage signal, the switch control terminal PG2 provides a high voltage signal, E1 provides a high voltage signal as shown in FIG. 8A. The third transistor M3 is turned off, the first transistor M1 and the seventh transistor M7 are turned on, the initial voltage terminal 10 provides the initial voltage Vint, and the Vint is written into the first node A and the anode of the organic light-emitting diode O1; since the second node B is in a floating state, through the coupling effect of C1, the potential of the second node B changes with the potential of the first node A, and since the third transistor M3 is turned off, the Vdata+Vth is still stored in C1. In the first reset phase S71, the potential of the first node A is Vint, the potential of the second node B is ELVDD+(Vint−(Vdata+Vth)), and the potential of the third node C is ELVDD.

Figure 8B:
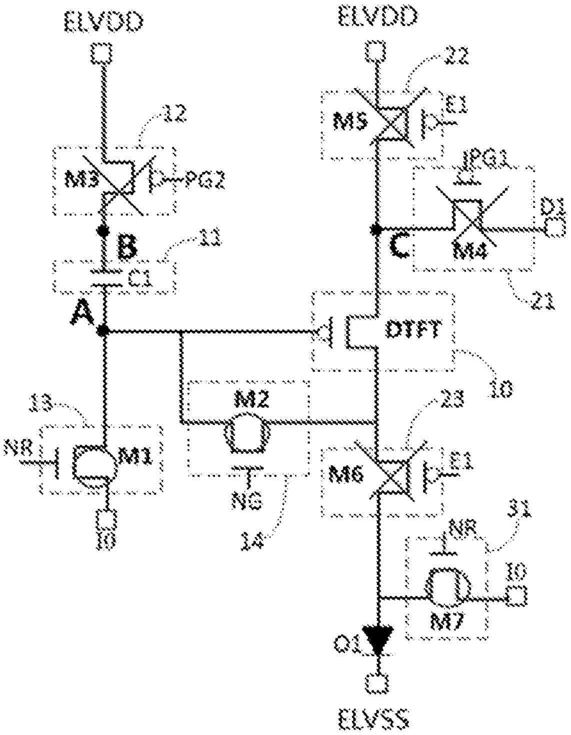
FIG. 8B is a schematic diagram illustrating an operation state of the pixel circuit shown in FIG. 4 in a second reset phase according to at least one embodiment of the present disclosure.

In the second reset phase S72, the initialization control terminal NR provides a high voltage signal, the compensation control terminal NG provides a high voltage signal, the write control terminal PG1 provides a high voltage signal, the switch control terminal PG2 provides a high voltage signal, E1 provides a high voltage signal, as shown in FIG. 8B. The first transistor M1 and the seventh transistor M7 are turned on, the second transistor M2 is turned on, the third transistor M3, the fifth transistor M5, the sixth transistor M6 and the fourth transistor M4 are turned off, and the third node C is in a floating state.

At the start of the second reset phase S72, the drive transistor DTFT is turned on, and the electric potential of the third node C gradually decreases from the ELVDD to the initial voltage terminal 10 through the drive transistor DTFT. The second transistor M2 and the first transistor M1, until the drive transistor DTFT is turned off, at this moment, the electric potential of the third node C is Vint-Vth, the drive transistor DTFT is in an OFF-Bias state, at this moment, the electric potential of the first node A continues to be Vint, and C1 still keeps Vdata+Vth.

Figure 8C:
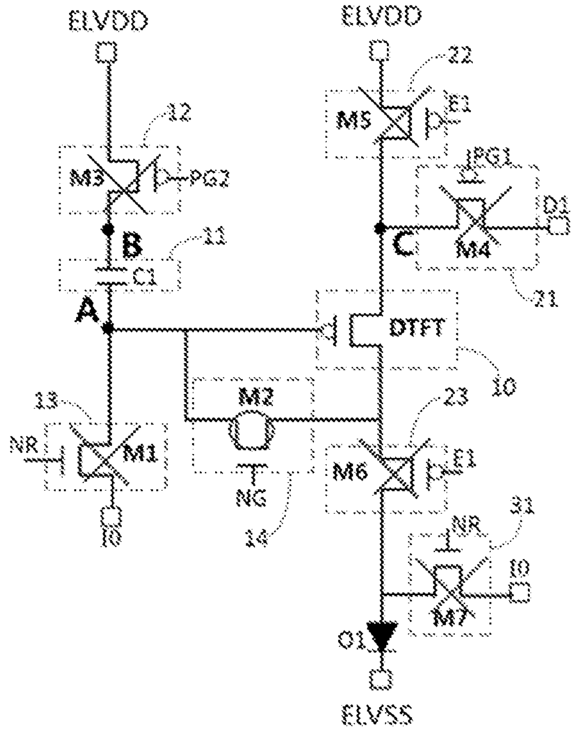
FIG. 8C is a schematic diagram illustrating an operation state of the pixel circuit shown in FIG. 4 in a hold phase according to at least one embodiment of the present disclosure.

In the hold phase S73, the initialization control terminal NR provides a low voltage signal, the compensation control terminal NG provides a high voltage signal, the write control terminal PG1 and the switch control terminal PG2 both provide a high voltage signal, E1 provides a high voltage signal, as shown in FIG. 8C. The second transistor M2 is turned on, the first transistor M1, a third transistor M3, the fourth transistor M4, the fifth transistor M5, the sixth transistor M6 and the seventh transistor M7 are all turned off, a drive transistor DTFT still maintains an OFF-Bias state, and the voltage of each node is consistent with that in a second reset phase S72.

Figure 8D:
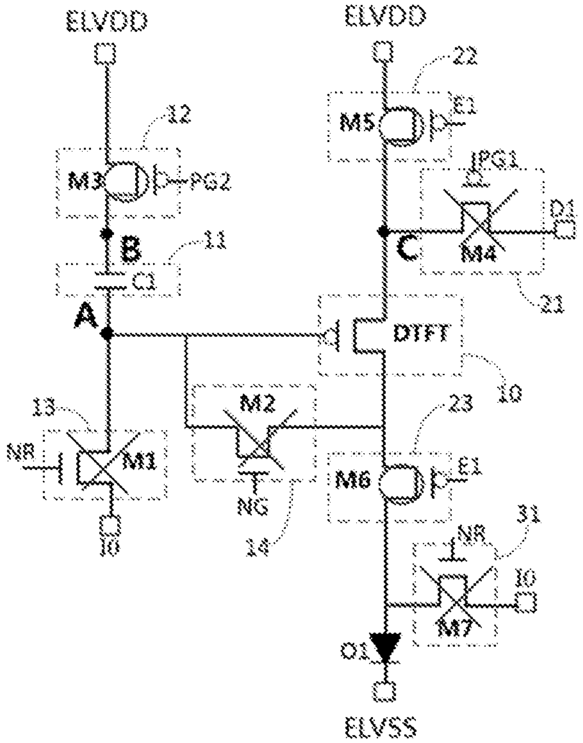
FIG. 8D is a schematic diagram illustrating an operation state of the pixel circuit shown in FIG. 4 in a first light-emitting phase according to at least one embodiment of the present disclosure.

In the first light-emitting phase S74, the initialization control terminal NR provides a low voltage signal, the compensation control terminal NG provides a low voltage signal, the write control terminal PG1 and the switch control terminal PG2 provide a low voltage signal, E1 provides a low voltage signal, as shown in FIG. 8D. The third transistor M3, the fifth transistor M5, the sixth transistor M6 and the drive transistor DTFT are turned on, the first transistor M1, the second transistor M2, the fourth transistor M4 and the seventh transistor M7 are all turned off, and the drive transistor DTFT drives the organic light-emitting diode O1 to emit light.

In the first light-emitting phase S74, the potential of the second node B is ELVDD again, at this moment, the first node A is in a floating state, and through the coupling action of C1, the potential of the first node A becomes Vint+(ELVDD−(ELVDD+(Vint−(Vdata+Vth)))). That is to say, the potential of the first node A is Vdata+Vth, the current flowing through the organic light-emitting diode O1 is proportional to Vgs−Vth, that is to say, the current flowing through the organic light-emitting diode O1 is proportional to $(Vdata-ELVDD)^2$, and the current flowing through the organic light-emitting diode O1 is independent of Vth; here, Vgs is the gate-source voltage of the drive transistor DTFT.

In FIG. 8A, FIG. 8B, FIG. 8C, and FIG. 8D, a circle represents that the corresponding transistor is turned on and a cross represents that the corresponding transistor is turned off.

Figure 9:
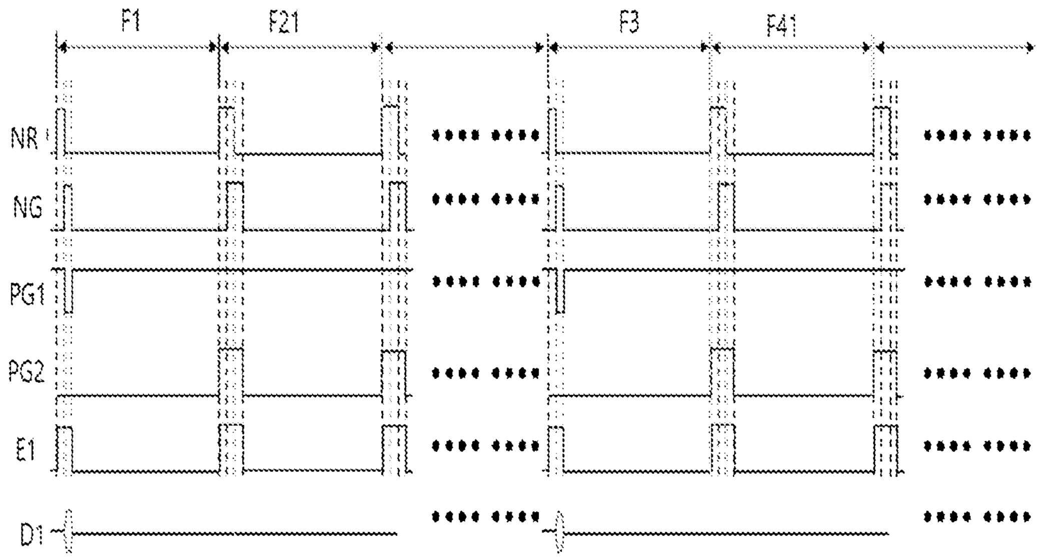
FIG. 9 is an operational timing diagram of the pixel circuit of the present disclosure as shown in FIG. 4.

FIG. 9 is an operational timing diagram of at least one embodiment of the pixel circuit shown in FIG. 4 of the present disclosure. In FIG. 9, reference numeral F1 is a first refresh frame, reference numeral F3 is a second refresh frame, reference numeral F21 is a first hold frame, and reference numeral F41 is a second first hold frame. When the refresh frequency of at least one embodiment of the pixel circuit of the present disclosure as shown in FIG. 4 is 60 Hz, one display cycle may include a refresh frame and 59 hold frames, with 58 hold frames also provided between the first hold frame F21 and the second refresh frame F3.

A drive method is provided according to an embodiment of the present disclosure, which is applied to the pixel circuit described above. A display cycle includes a refresh frame and a hold frame, and the hold frame includes a first reset phase, a second reset phase and a first light-emitting phase which are sequentially set; the drive method includes:

- in the refresh frame and the first light-emitting phase, the switch control circuit controlling the first voltage terminal to be connected to the second end of the energy storage circuit under control of the switch control signal;
- in the first reset phase and the second reset phase, the switch control circuit controlling the first voltage terminal to be disconnected from the second end of the energy storage circuit under control of the switch control signal, and the first initialization circuit writing a first initial voltage provided by the first initial voltage terminal into the control terminal of the drive circuit under control of the initialization control signal; and
- in the second reset phase, the compensation control circuit controlling the control terminal of the drive circuit to be connected to the second terminal of the drive circuit under control of the compensation control signal.

In the drive method according to the embodiments of the present disclosure, in low frequency display, in the first reset phase and the second reset phase in the hold frame, a first initial voltage is written into the control terminal of the drive circuit by the first initialization circuit under the control of the initialization control signal, so as to reset the gate-source voltage of the drive transistor in the drive circuit 10 during a partial period of each hold frame, so that the drive transistor is in an OFF-Bias state, and the amount of charges accumulated and trapped in the drive transistor is reduced by resetting the drive transistor in each frame, which improves first frame brightness deficiency and short-term afterimage at the time of picture switching during low-frequency driving.

Optionally, the hold frame further includes a hold phase arranged between the second reset phase and the first light-emitting phase; the drive method further includes: in the hold phase, the compensation control circuit controls the control terminal of the drive circuit to be connected to the second terminal of the drive circuit under control of the compensation control signal.

In at least one embodiment of the present disclosure, the refresh frame includes an initialization phase and a compensation phase which are sequentially set; the drive method further includes:

- in the initialization phase, the first initialization circuit writes the first initial voltage into the control terminal of the drive circuit under control of the initialization control signal, so as to initialize the potential of the control terminal of the drive circuit;
- in the compensation phase, the compensation control circuit controls the control terminal of the drive circuit to be connected to the second terminal of the drive circuit under control of the compensation control signal.

Optionally, the pixel circuit further includes a data writing circuit, a first light-emitting control circuit and a second light-emitting control circuit; the refresh frame further includes a second light-emitting phase set after the compensation phase; the drive method further includes:

- in the compensation phase, the data writing circuit writes a data voltage provided by a data line into the first terminal of the drive circuit under control of a write control signal provided by a write control terminal, so as to write the data voltage;
- in the first light-emitting phase and the second light-emitting phase, the first light-emitting control circuit controls a first voltage terminal to be connected to the first terminal of the drive circuit under control of a light-emitting control signal provided by a light-emitting control terminal, and the second light-emitting control circuit controls the second terminal of the drive circuit to be connected to a first electrode of a light-emitting element under control of the light-emitting control signal, and the drive circuit drives the light-emitting element to emit light.

In at least one embodiment of the present disclosure, the pixel circuit further includes a second initialization circuit; the drive method further includes: in the initialization phase, the first reset phase and the second reset phase, the second initialization circuit writes a second initial voltage provided by a second initial voltage terminal into the first electrode of the light-emitting element under control of the initialization control signal, so as to control the light-emitting element not to emit light.

The display device described in the embodiments includes the pixel circuit described above.

The display device provided by the embodiments of the present disclosure may be a mobile phone, a tablet computer, a television, a display, a notebook computer, a digital photo frame, a navigator, or any product or component with display functions.

While the foregoing embodiments are directed to the preferred embodiments of the present disclosure, it will be understood by those skilled in the art that numerous modifications and adaptations can be made without departing from the principles of the disclosure, and such modifications and adaptations shall fall within the protection scope of the disclosure.

What is claimed is:

1. A pixel circuit, comprising: a light-emitting element, a drive circuit, an energy storage circuit, a switch control circuit, a first initialization circuit, and a compensation control circuit; wherein a display cycle of the pixel circuit comprises a refresh frame and a hold frame, and the hold frame comprises a first reset phase, a second reset phase and a first light-emitting phase that are sequentially set; a first end of the energy storage circuit is electrically connected to a control terminal of the drive circuit, and the energy storage circuit is configured to store electric energy;

- the switch control circuit is electrically connected to a switch control terminal, a first voltage terminal and a second end of the energy storage circuit, and is configured to control the first voltage terminal to be connected to the second end of the energy storage circuit in the refresh frame and the first light-emitting phase, and to control the first voltage terminal to be disconnected from the second end of the energy storage circuit in the first reset phase and the second reset phase under control of a switch control signal provided by the switch control terminal;
- the first initialization circuit is electrically connected to an initialization control terminal, a first initial voltage terminal and the control terminal of the drive circuit, and is configured to write a first initial voltage provided by the first initial voltage terminal into the control terminal of the drive circuit in the first reset phase and the second reset phase, under control of an initialization control signal provided by the initialization control terminal;
- the compensation control circuit is electrically connected to a compensation control terminal, the control terminal of the drive circuit and a second terminal of the drive circuit, and is configured to control the control terminal of the drive circuit to be connected to the second terminal of the drive circuit under control of a compensation control signal provided by the compensation control terminal in the second reset phase; and
- the drive circuit is configured to generate a drive current for driving the light-emitting element under control of a potential of the control terminal of the drive circuit.

2. The pixel circuit according to claim 1, wherein the refresh frame comprises an initialization phase and a compensation phase which are sequentially set;

- the first initialization circuit is configured to write the first initial voltage into a control terminal of the drive circuit under control of the initialization control signal in the initialization phase; and
- the compensation control circuit is configured to control the control terminal of the drive circuit to be connected to the second terminal of the drive circuit in the compensation phase under control of the compensation control signal.

3. The pixel circuit according to claim 2, further comprising a data writing circuit;

- wherein the data writing circuit is electrically connected to a write control terminal, a data line and a first terminal of the drive circuit, and is configured to write a data voltage provided by the data line into the first terminal of the drive circuit under control of a write control signal provided by the write control terminal in the compensation phase.

4. The pixel circuit according to claim 3, further comprising a first light-emitting control circuit and a second light-emitting control circuit; wherein the refresh frame further comprises a second light-emitting phase that is set after the compensation phase;

the first light-emitting control circuit is electrically connected to a light-emitting control terminal, the first voltage terminal and the first terminal of the drive circuit, and is configured to control the first voltage terminal to be connected to the first terminal of the drive circuit in the first light-emitting phase and the second light-emitting phase under control of a light-emitting control signal provided by the light-emitting control terminal;

the second light-emitting control circuit is electrically connected to the light-emitting control terminal and the second terminal of the drive circuit and a first electrode of the light-emitting element, and is configured to control the second terminal of the drive circuit to be connected to the first electrode of the light-emitting element under control of the light-emitting control signal in the first light-emitting phase and the second light-emitting phase; and a second electrode of the light-emitting element is electrically connected to a second voltage terminal.

5. The pixel circuit according to claim 1, further comprising a second initialization circuit; wherein the second initialization circuit is electrically connected to the initialization control terminal, a second initial voltage terminal and a first electrode of the light-emitting element, and is configured to write a second initial voltage provided by the second initial voltage terminal into the first electrode of the light-emitting element under control of the initialization control signal.

6. The pixel circuit according to claim 1, wherein the first initialization circuit comprises a first transistor, the compensation control circuit comprises a second transistor, and the switch control circuit comprises a third transistor;

a control electrode of the first transistor is electrically connected to the initialization control terminal, a first electrode of the first transistor is electrically connected to the first initial voltage terminal, and a second electrode of the first transistor is electrically connected to the control terminal of the drive circuit;

a control electrode of the second transistor is electrically connected to the compensation control terminal, a first electrode of the second transistor is electrically connected to the control terminal of the drive circuit, and a second electrode of the second transistor is electrically connected to the second terminal of the drive circuit; and a control electrode of the third transistor is electrically connected to the switch control terminal, a first electrode of the third transistor is electrically connected to the first voltage terminal, and a second electrode of the third transistor is electrically connected to the second end of the energy storage circuit.

7. The pixel circuit according to claim 1, wherein the energy storage circuit comprises a storage capacitor, and the drive circuit comprises a drive transistor;

a first end of the storage capacitor is the first end of the energy storage circuit, and a second end of the storage capacitor is the second end of the energy storage circuit; and a control electrode of the drive transistor is the control terminal of the drive circuit, a first electrode of the drive transistor is the first terminal of the drive circuit, and a second electrode of the drive transistor is the second terminal of the drive circuit.

8. The pixel circuit according to claim 3, wherein the data writing circuit comprises a fourth transistor;

a control electrode of the fourth transistor is electrically connected to the write control terminal, a first electrode of the fourth transistor is electrically connected to the data line, and a second electrode of the fourth transistor is electrically connected to the first terminal of the drive circuit.

9. The pixel circuit according to claim 4, wherein the first light-emitting control circuit comprises a fifth transistor, and the second light-emitting control circuit comprises a sixth transistor;

a control electrode of the fifth transistor is electrically connected to the light-emitting control terminal, a first electrode of the fifth transistor is electrically connected to the first voltage terminal, and a second electrode of the fifth transistor is electrically connected to the first terminal of the drive circuit; and a control electrode of the sixth transistor is electrically connected to the light-emitting control terminal, a first electrode of the sixth transistor is electrically connected to the second terminal of the drive circuit, and a second electrode of the sixth transistor is electrically connected to the first electrode of the light-emitting element.

10. The pixel circuit according to claim 5, wherein the second initialization circuit comprises a seventh transistor;

a control electrode of the seventh transistor is electrically connected to the initialization control terminal, a first electrode of the seventh transistor is electrically connected to the second initial voltage terminal, and a second electrode of the seventh transistor is electrically connected to the first electrode of the light-emitting element.

11. A drive method, applied to the pixel circuit according to claim 1 comprising:

in the refresh frame and the first light-emitting phase, the switch control circuit controlling the first voltage terminal to be connected to the second end of the energy storage circuit under control of the switch control signal;

in the first reset phase and the second reset phase, the switch control circuit controlling the first voltage terminal to be disconnected from the second end of the energy storage circuit under control of the switch control signal, and the first initialization circuit writing a first initial voltage provided by the first initial voltage terminal into the control terminal of the drive circuit under control of the initialization control signal; and in the second reset phase, the compensation control circuit controlling the control terminal of the drive circuit to be connected to the second terminal of the drive circuit under control of the compensation control signal.

12. The drive method according to claim 11, wherein the hold frame further comprises a hold phase between the second reset phase and the first light-emitting phase; the drive method further comprises:

in the hold phase, the compensation control circuit controlling the control terminal of the drive circuit to be connected to the second terminal of the drive circuit under control of the compensation control signal.

13. The drive method according to claim 11, wherein the refresh frame comprises an initialization phase and a compensation phase which are sequentially set; the drive method further comprises:

in the initialization phase, the first initialization circuit writing the first initial voltage into the control terminal of the drive circuit under control of the initialization control signal; and in the compensation phase, the compensation control circuit controlling the control terminal of the drive circuit to be connected to the second terminal of the drive circuit under control of the compensation control signal.

14. The drive method according to claim 13, wherein the pixel circuit further comprises a data writing circuit, a first light-emitting control circuit and a second light-emitting control circuit; the refresh frame further comprises a second light-emitting phase that is set after the compensation phase; the drive method further comprises:

in the compensation phase, the data writing circuit writing a data voltage provided by a data line into the first terminal of the drive circuit under control of a write control signal provided by a write control terminal;

in the first light-emitting phase and the second light-emitting phase, the first light-emitting control circuit controlling the first voltage terminal to be connected to the first terminal of the drive circuit under control of a light-emitting control signal provided by a light-emitting control terminal, the second light-emitting control circuit controlling the second terminal of the drive circuit to be connected to a first electrode of a light-emitting element under control of the light-emitting control signal, and the drive circuit driving the light-emitting element to emit light.

15. The drive method according to claim 14, wherein the pixel circuit further comprises a second initialization circuit; the drive method further comprises:

in the initialization phase, the first reset phase and the second reset phase, the second initialization circuit writing a second initial voltage provided by a second initial voltage terminal into the first electrode of the light-emitting element under control of the initialization control signal.

16. A display device, comprising the pixel circuit according to claim 1.

* * * * *